United States Patent [19]

Ito et al.

[11] Patent Number: 4,731,993

[45] Date of Patent: Mar. 22, 1988

[54] EXHAUST APPARATUS FOR A V-TYPE INTERNAL COMBUSTION ENGINE

[75] Inventors: Yoshiaki Ito, Susono; Ryuichi Deguchi, Shimizu; Hiroki Matsuoka; Toru Hanafusa, both of Susono, all of Japan

[73] Assignee: Toyota Jidosha Kabushiki Kaisha, Toyota, Japan

[21] Appl. No.: 8,534

[22] Filed: Jan. 29, 1987

[30] Foreign Application Priority Data

Jan. 29, 1986 [JP] Japan .................................. 61-10259

[51] Int. Cl.⁴ ........................... F01N 7/10; F01N 3/28
[52] U.S. Cl. ........................................ 60/299; 60/322; 60/323
[58] Field of Search .................. 60/299, 301, 323, 322

[56] References Cited

U.S. PATENT DOCUMENTS

| 4,522,282 | 6/1985 | Yamamoto | 60/323 |
| 4,653,270 | 3/1987 | Takii | 60/323 |

FOREIGN PATENT DOCUMENTS

| 104317 | 6/1983 | Japan | 60/323 |
| 60-17220 | 1/1985 | Japan . | |
| 50215 | 3/1985 | Japan | 60/323 |

Primary Examiner—Douglas Hart
Attorney, Agent, or Firm—Cushman, Darby & Cushman

[57] ABSTRACT

An exhaust apparatus connected to a V-type internal combustion engine which is mounted in an engine compartment in a front part of a vehicle. The exhaust apparatus comprises a front exhaust manifold and a rear exhaust manifold connected to banks of the V-type engine respectively, an exhaust assembly connected to the exhaust manifolds and a catalytic converter interposed in the exhaust assembly. The wall thickness of the front exhaust manifold is made thinner than that of the rear exhaust manifold. By the thin front exhaust manifold, the heat capacity of the front exhaust path extending from the front exhaust manifold toward the catalytic converter is lessened, thereby suppressing the dropping of temperature of the exhaust gas flowing through the front exhaust path. As a result, the dropping of temperature of the exhaust gas reaching the catalytic converter is suppressed as a whole, and a catalyst in the catalytic converter is warmed up quickly to a required temperature.

7 Claims, 5 Drawing Figures

EXHAUST APPARATUS FOR A V-TYPE INTERNAL COMBUSTION ENGINE

BACKGROUND OF THE INVENTION

1. Field of the Invention

The present invention relates to an exhaust apparatus connected to a V-type internal combustion engine that is mounted in an engine compartment which is located in a front part of a vehicle.

2. Description of the Prior Art

It is well known that a V-type internal combustion engine may be mounted in an engine compartment in a front part of a vehicle transversely to the longitudinal direction of the vehicle. When a catalytic converter is provided in an exhaust system for such a V-type engine, a pair of exhaust manifolds (that is, a front exhaust manifold and a rear exhaust manifold) are generally connected to the engine, an exhaust pipe having a junction is connected to the exhaust manifolds, and the catalytic converter is interposed in the exhaust pipe at a position downstream of the junction. Since the exhaust pipe extends toward a rear part of the vehicle, a front exhaust path extending from the front exhaust manifold to the junction of the exhaust pipe usually is made longer than a rear exhaust path extending from the rear exhaust manifold to the junction. The material and wall thickness of the pair of exhaust manifolds are usually set identically.

However, in such a conventional structure, since the front exhaust path is longer than the rear exhaust path, the quantity of heat radiated from the exhaust gas flowing through the front exhaust path becomes larger than that radiated from the exhaust gas flowing through the rear exhaust path, and by this large heat radiation from the front exhaust path, the temperature of the exhaust gas reaching the catalytic converter becomes relatively low. Moreover, since the wind due to running of the vehicle influences the front exhaust path more strongly than the rear exhaust path, the heat losses from the front exhaust path will be larger than those from the rear exhaust path, thereby dropping the temperature of the exhaust gas reaching the catalytic converter as a whole. When the temperature of the exhaust gas is low, it takes longer for the catalyst to warm up and be effective. Generally, a catalyst can purify exhaust gas only when the temperature of the catalyst is above a certain point. For that reason, it is desirable for the catalyst to be heated as quickly as possible so as to minimize emissions of noxious gases into the atmosphere.

With respect to the above problem, JP-A-60-17220 discloses a device that supplies secondary air into the front exhaust path, whereby unburnt gas and other combustibles are caused to oxidize, thereby raising the temperature of the exhaust gas in the front exhaust path.

However, since a complicated mechanism and control system for the introduction of secondary air are required in this structure, the exhaust system becomes complicated and expensive.

SUMMARY OF THE INVENTION

An object of the present invention is to provide a simple an exhaust apparatus for a V-type internal combustion engine which can prevent the temperature of an exhaust gas flowing through a front first exhaust path from becoming too low so that a catalyst may quickly be brought to and maintained at a required temperature.

In an exhaust apparatus for a V-type internal combustion engine according to the present invention, the V-type internal combustion engine is mounted in an engine compartment in a front part of a vehicle transversely to the longitudinal direction of the vehicle, and the exhaust apparatus is connected to the V-type engine. The exhaust apparatus comprises a first front exhaust manifold and a second rear exhaust manifold connected to banks of the V-type engine respectively, an exhaust assembly having a first front portion connected to the front exhaust manifold and a second rear portion connected to the rear exhaust manifold and extending toward a rear part of the vehicle from where the front portion and the rear portion join at a junction, and a catalytic converter interposed in an exhaust pipe at a position downstream of that junction. The wall thickness of the front exhaust manifold is made thinner than that of the rear exhaust manifold.

The front exhaust manifold is preferably constructed by using a relatively thin stainless steel plate, or it may be constructed from cast iron. The catalytic converter is preferably a converter in which a three-way catalyst is housed. Desirably, the wall thickness of the front portion of the exhaust assembly is also set thinner than that of the rear portion of the exhaust assembly.

In the exhaust apparatus, since the exhaust path from the V-type engine extends toward the rear part of the vehicle, the front exhaust path from the front exhaust manifold to the junction of the exhaust pipe is usually made longer than the rear exhaust path from the rear exhaust manifold to the junction. However, since the front exhaust manifold is thinner than the rear exhaust manifold, the heat capacity of the front exhaust manifold becomes less than that of the rear exhaust manifold. If the wall of the rear exhaust manifold is made to the same thickness as a conventional manifold, the heat capacity of the front exhaust manifold will consequently be less than that of the conventional front exhaust manifold. Therefore, even when starting cold, the front exhaust manifold is warmed up quickly by the exhaust gas exhausted from the front bank of the V-type engine, with the front exhaust manifold absorbing very little of the heat energy in the exhaust. As a result, the drop in temperature of the exhaust gas flowing through the front exhaust path is minimized. Consequently, the temperature of the exhaust gas reaching the catalytic converter will be somewhat higher than that in the conventional exhaust apparatus. The catalyst is warmed up to a required temperature quickly, and the catalyst acts to purify exhaust gas more quickly than in the conventional apparatus.

In the present invention, since the wall thickness of the front exhaust manifold is made thin, a complicated mechanism and a control system are not required at all and the present invention can be carried out easily.

Also, since the outside dimension of the V-type engine becomes smaller by the thin front exhaust manifold, the design freedom in accordance with mounting of the engine is increased.

Moreover, it is also contemplated that the rear exhaust manifold could also be made thin in order to raise the temperature of the exhaust gas reaching the catalytic converter. However, if the rear exhaust manifold were formed thin, the exhaust noise radiated from the rear exhaust manifold increases, thereby exacerbating interior car noise. Accordingly, in the present invention, the level of the interior car noise can be suppressed to the same level as the conventional apparatus by setting the wall thickness of the rear exhaust manifold to the thickness similar to the conventional one, and at the same time, the temperature of the exhaust gas reaching the catalytic converter can be raised by setting lessening wall thickness of the front exhaust manifold.

BRIEF DESCRIPTION OF THE DRAWINGS

The above and other objects, features and advantages of the present invention will become apparent and more readily appreciated from the following detailed description of the preferred exemplary embodiments of the invention, taken in conjunction with the accompanying drawings, in which.

DETAILED DESCRIPTION OF THE PREFERRED EMBODIMENTS

Figure 1:
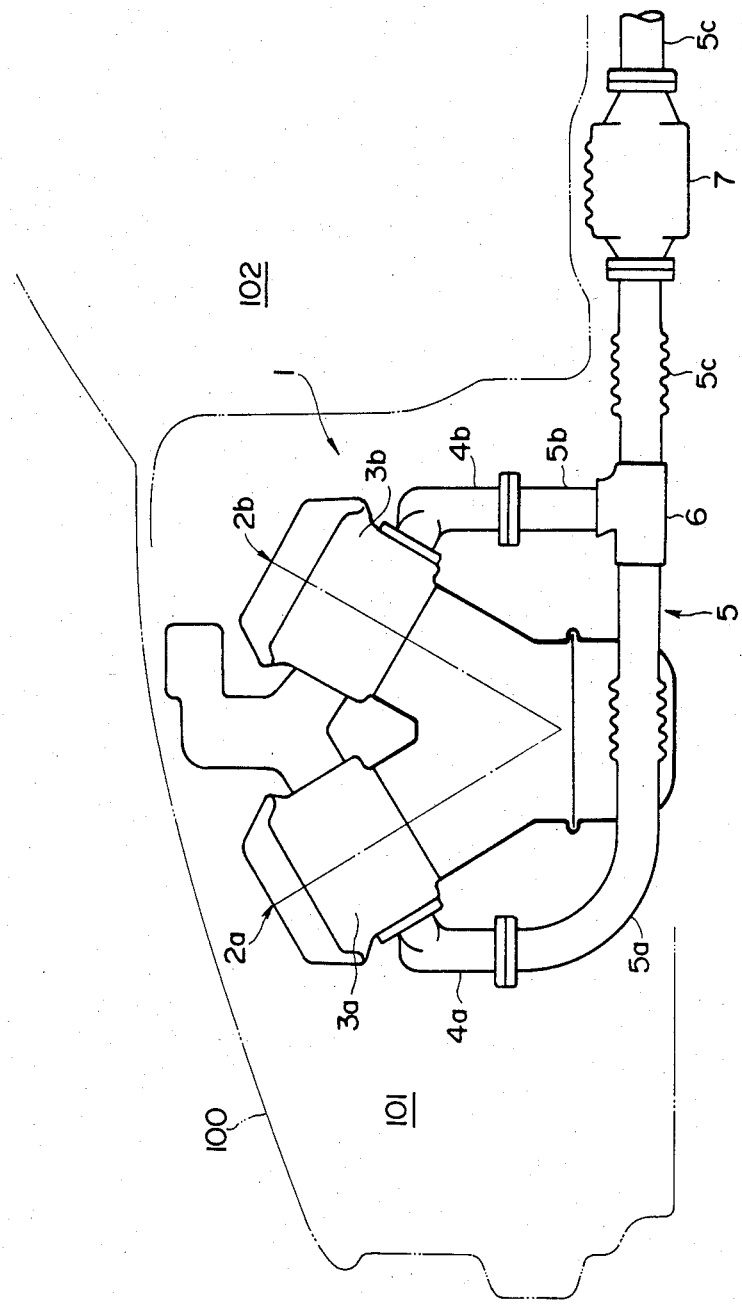
FIG. 1 is a side view of an exhaust apparatus for a V-type internal combustion engine according to an embodiment of the present invention.
Figure 2:
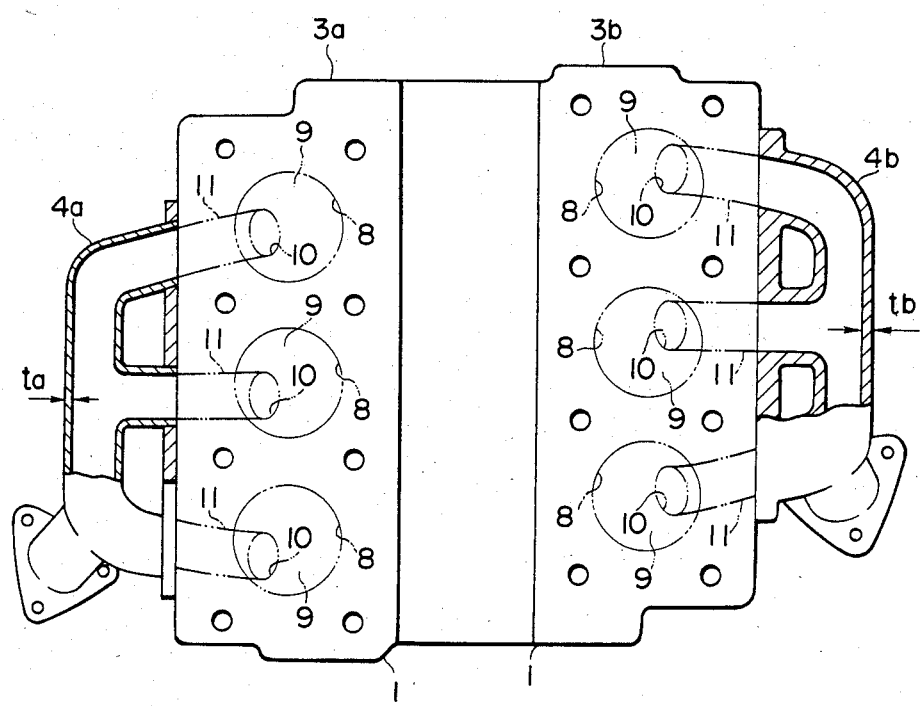
FIG. 2 is an enlarged schematic partial plan view of the apparatus shown in FIG. 1, cutting out partially.

FIGS. 1 and 2 show an exhaust apparatus for a V-type internal combustion engine according to an embodiment of the present invention. In FIG. 1, a V-type internal combustion engine 1 is mounted in an engine compartment 101 located in a front part of a vehicle 100. 102 shows an interior of vehicle 100. V-type engine 1 is a V-6 engine in this embodiment. V-type engine 1 is mounted transversely to a longitudinal direction of vehicle 100, and a bank 2a and a bank 2b of the engine 1 are arranged in the longitudinal direction of vehicle 100.

A front exhaust manifold 4a and a rear exhaust manifold 4b are connected to cylinder heads 3a and 3b, respectively of banks 2a and 2b of the V-type engine 1. Each of exhaust manifolds 4a and 4b extends downward after extending outward from V-type engine 1. An exhaust assembly 5 is connected to front exhaust manifold 4a and rear exhaust manifold 4b. A front portion 5a of exhaust assembly 5 is connected to front exhaust manifold 4a, and a rear portion 5b of exhaust assembly 5 is connected to rear exhaust manifold 4b. Front portion 5a extends from the front side to the rear side of V-type engine 1 through the side of a lower portion of the engine 1, rear portion 5b extends downward along the rear surface of the engine 1, and both of front and rear portions 5a and 5b join at a junction 6. Exhaust assembly 5 extends as an exhaust pipe 5c toward a rear part of vehicle 100 after the above joining at junction 6. At a position downstream of this junction 6, a catalytic converter 7 is interposed in exhaust assembly 5. Catalytic converter 7 has a catalyst (not shown) therein. Desirably, the catalyst comprises a three-way catalyst.

As shown in FIG. 2, exhaust ports 11 in cylinder heads 3a and 3b are communicated with combustion chambers 9 in cylinders 8 via exhaust valves 10, respectively. Exhaust ports 11 in cylinder head 3a are connected to the front exhaust manifold 4a and exhaust gas passages from cylinder head 3a join in the manifold 4a, and exhaust ports 11 in cylinder head 3b are connected to rear exhaust manifold 4b and exhaust gas passages from cylinder head 3b join in the manifold 4b.

In this pair of exhaust manifolds 4a and 4b, a wall thickness (ta) of front exhaust manifold 4a is set smaller than a wall thickness (tb) of rear exhaust manifold 4b. The wall thickness (ta) is set to, for example, about 1.5 mm, and the wall thickness (tb) is set to a conventional value, for example, 3.5-4 mm. This thin front exhaust manifold 4a can be formed by use of a thin stainless steel plate. Of course, front exhaust manifold 4a may be constructed from cast iron as long as the wall thickness (ta) is set small. Rear exhaust manifold 4b can be constructed from cast iron similarly to in a conventional apparatus.

In the exhaust apparatus according to the embodiment, exhaust gas from combustion chambers 9 in cylinders 8 flows into exhaust manifolds 4a and 4b respectively, through positions of exhaust valves 10 and passages of exhaust ports 11. After that, the exhaust gas flows from exhaust manifolds 4a and 4b to junction 6 through portions 5a and 5b of exhaust assembly 5, and join at junction 6. The exhaust gas from junction 6 flows through portion 5c of exhaust assembly 5 and soon reaches catalytic converter 7. In catalytic converter 7, emissions contained in the exhaust gas are appropriately purified by the catalyst, and purified gas is exhausted to an atmosphere.

Since the temperature of the exhaust path from exhaust ports 11 to catalytic converter 7 is very low compared with the exhaust gas exhausted from combustion chamber 9 when the engine is cold, a large quantity of heat from the exhaust gas is taken away at each portion of the exhaust path, thereby causing the warming up of catalytic converter 7 to be late. Particularly, since the front exhaust path from front exhaust manifold 4a to junction 6 is longer than the rear exhaust path, the quantity of heat radiation from the front exhaust path tends to become larger than that from the rear exhaust path.

In the present invention, however, since the wall thickness (ta) (for example, 1.5 mm) of front exhaust manifold 4a is set smaller than the wall thickness (tb) (for example, 3.5 mm) of rear exhaust manifold 4b, the heat capacity of front exhaust manifold 4a is suppressed to a small quantity even if the length or the outer size of the exhaust manifold is the same as of a conventional apparatus. In the exhaust path from front exhaust manifold 4a to junction 6, the front exhaust manifold 4a represents the bulk of the heat capacity of the exhaust path as a whole. Therefore, when the heat capacity of front exhaust manifold 4a becomes small, the entire heat capacity of the front exhaust path becomes very small. As a result, the temperature of the front exhaust path, that is, front exhaust manifold 4a and front portion 5a of exhaust assembly 5, is raised quickly, and the dropping of the temperature of the exhaust gas flowing through the front exhaust path is suppressed to a small quantity.

The temperature of the exhaust gas flowing through the rear exhaust path also drops. However, since the length of the rear exhaust path is comparatively small, the dropping of the temperature is relatively small. Thus the exhaust gas from the front exhaust path, which is suppressed upon the dropping of the temperature, and the exhaust gas from the rear exhaust path, which is maintained in the condition of relatively high temperature, join at junction 6, and joined exhaust gas is sent to the catalyst of catalytic converter 7. Namely, the temperature of the exhaust gas reaching catalytic converter 7 is prevented from a large dropping. The catalyst is warmed up to a required temperature in a short time by the abovementioned exhaust gas to a high temperature.

Even where exhaust manifolds 4a and 4b receive a high heat load, such as during a condition of high load of the engine, since the front exhaust path is exposed in the cooling air flow due to a cooling fan and running of the vehicle, the heat resistance of front exhaust manifold 4a is secured even if the wall thickness (ta) is small. The cooling air can not sufficiently cool the rear exhaust path, but since the wall thickness (tb) is sufficiently large, the heat resistance of rear exhaust manifold 4b is also secured.

Moreover, merely from the viewpoint of raising the temperature of the exhaust gas reaching catalytic converter 7, it seems preferable that rear exhaust manifold 4b also has a small wall thickness. However, if this were done, the exhaust noise radiated from the rear exhaust manifold 4b increases, thereby increasing the noise in the interior 102 of the vehicle. By keeping the wall thickness (tb) of rear exhaust manifold 4b to the same size as of a conventional manifold, the level of the above noise can be suppressed low.

Next, a more specific example will be described, completely with comparisons.

Table 1 shows the wall thickness and material of front exhaust manifolds and rear exhaust manifolds, for example 1 according to the present invention and comparisons 1 and 2. Comparison 1 shows a conventional exhaust apparatus wherein both of wall thicknesses of the front and rear exhaust manifolds are large. Both of the manifolds are constructed from cast iron. Comparison 2 shows an exhaust apparatus wherein both of wall thicknesses of the front and rear exhaust manifolds are small. Both of the manifolds are constructed using a stainless steel plate (thickness: 1.5 mm). Example 1 shows an exhaust apparatus which has the same front exhaust manifold as in Comparison 2 and the same rear exhaust manifold as in Comparison 1.

TABLE 1

|  | wall thickness of front exhaust manifold | wall thickness of rear exhaust manifold | material of front exhaust manifold | material of rear exhaust manifold |
| --- | --- | --- | --- | --- |
| comparison 1 | 3 | 3.5 | cast iron | cast iron |
| comparison 2 | 1.5 | 1.5 | stainless steel | stainless steel |
| example 1 | 1.5 | 3.5 | stainless steel | stainless steel |

Figure 3:
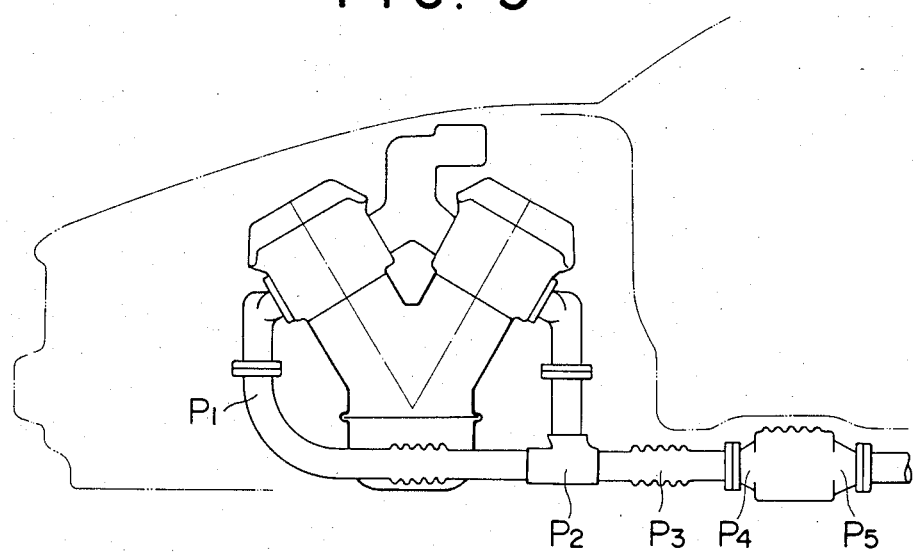
FIG. 3 is a schematic side view of an exhaust apparatus showing temperature measuring points.

FIG. 3 shows temperature measuring points $P_1$, $P_2$, $P_3$, $P_4$ and $P_5$ in comparisons 1 and 2 and in example 1. In the tests of comparison 1 and 2 and example 1, the same type engines, the same type vehicles and the same type catalytic converters are used. The driving conditions of the vehicles depend on the test procedure due to the EPA (Environmental Protection Agency). The test procedure consists of the tests of 18 patterns. Each of the 18 patterns is decided in accordance with driving speed and driving time. The first 1 through 5 patterns are performed under a cold conditions, the next 6–18 patterns are performed under a hot condition (HOT 1), and the further 1–5 patterns are performed under a hot condition (HOT 2). The total amount of emission exhausted from each engine during the above entire tests is measured.

Figure 4:
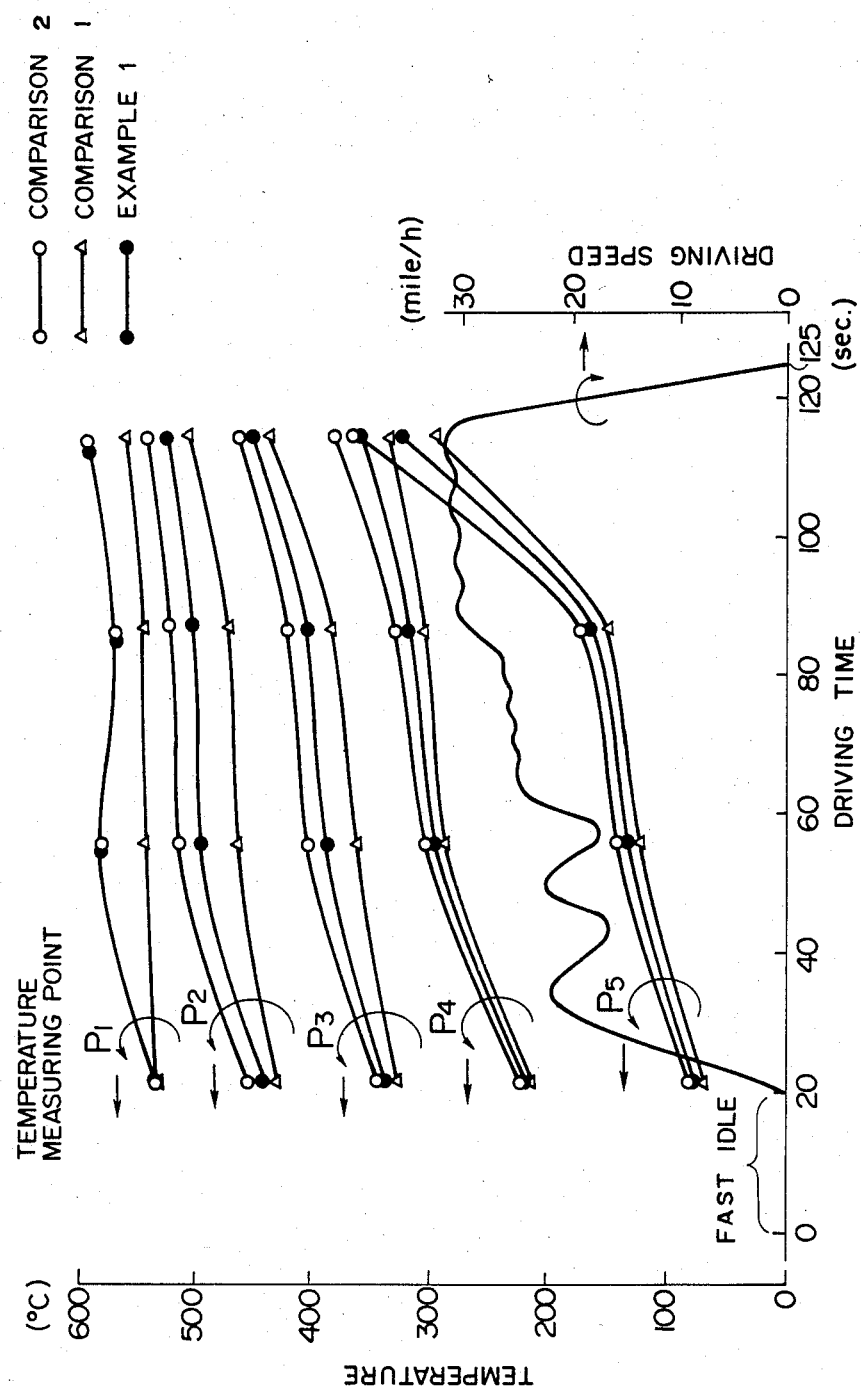
FIG. 4 is a graph showing measured temperatures at the temperature measuring points shown in FIG. 3, of the apparatus shown in FIG. 1 and of comparisons, in the first test pattern of the test procedure due to the EPA (Environmental Protection Agency)

FIG. 4 shows the data of measured temperature at measuring points shown in FIG. 3, in the first test of No. 1 pattern under the cold condition. As shown in FIG. 4, the data of example 1 show mediate temperatures between in comparison 1 and in comparison 2, and show higher temperatures than in comparison 1 which is a conventional apparatus.

Figure 5:
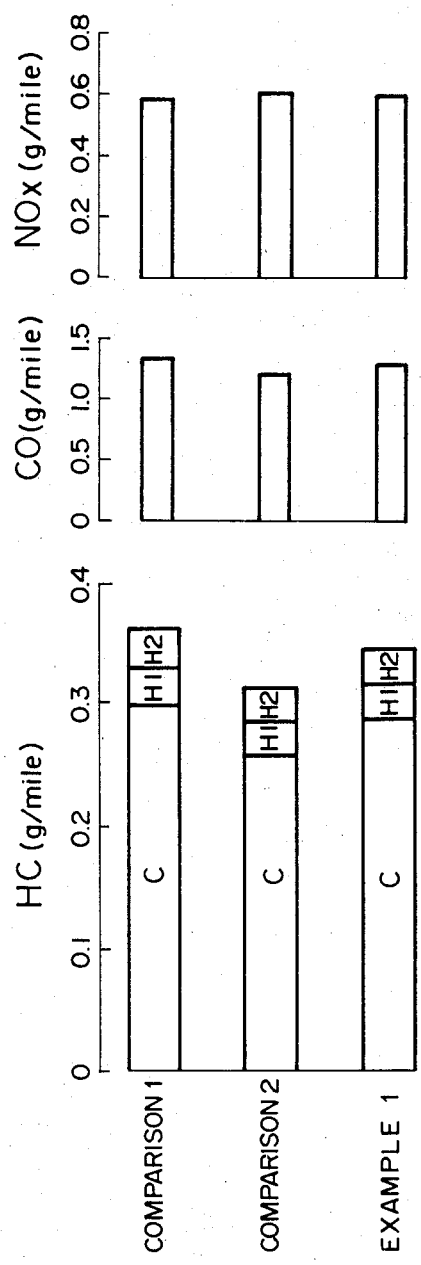
FIG. 5 is a graph showing amounts of exhausted HC, CO and NOx, of the apparatus shown in FIG. 1 and of comparisons, after the entire test procedure due to the EPA.

FIG. 5 shows the total amount of emission in accordance with HC, CO and NOx during the entire test procedure due to EPA. In FIG. 5, C shows the cold condition, H1 shows the HOT 1 condition and H 2 shows HOT 2 condition. As is evident from FIG. 5, particularly the amount of HC in example 1 decreases compared with in comparison 1.

Although only several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. An exhaust apparatus adapted for connection to a V-type internal combustion engine in an automobile having a first cylinder bank away from the passenger compartment of said automobile and a second cylinder bank proximate the passenger compartment of said automobile, comprising:
   a first exhaust manifold connected to said first cylinder bank;
   a second exhaust manifold connected to said second cylinder bank;
   said first exhaust manifold having a wall thickness which is thinner than the wall thickness of said second exhaust manifold;
   a catalytic converter; and
   means for connecting said first and second exhaust manifolds to said catalytic converter.

2. The exhaust apparatus of claim 1, wherein said connecting means comprises an exhaust assembly having a first portion which is connected to said first exhaust manifold, and a second portion which is connected to said second exhaust manifold, said first and second portions being jointed to an exhaust pipe at a junction.

3. The exhaust apparatus of claim 2, wherein said catalytic converter is disposed in said exhaust pipe.

4. The exhaust apparatus of claim 1, wherein said first exhaust manifold is constructed using a stainless steel plate.

5. The exhaust apparatus of claim 1, wherein said first exhaust manifold is constructed from cast iron.

6. The exhaust apparatus of claim 1, wherein said catalytic converter is a converter having a three-way catalyst.

7. The exhaust apparatus of claim 2, wherein said first portion of said exhaust assembly has a wall thickness thinner than the wall thickness of said second portion of said exhaust assembly.

* * * * *